US012620757B2

(12) United States Patent
Wolfschmitt et al.

(10) Patent No.: US 12,620,757 B2
(45) Date of Patent: May 5, 2026

(54) HIGH-CURRENT CONNECTION CLAMPING SCREW DEVICE AS WELL AS ELECTRICAL HIGH-CURRENT CONNECTOR AND HIGH-CURRENT LINE CONNECTOR

(71) Applicant: TE Connectivity Germany GmbH, Bensheim (DE)

(72) Inventors: Heiko Wolfschmitt, Bensheim (DE); Richard A. Forell, Bensheim (DE); Joachim Schneider, Bensheim (DE); Wolfgang Balles, Bensheim (DE); Walter Saenger, Bensheim (DE); Manuel Eheim, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 550 days.

(21) Appl. No.: 17/943,515

(22) Filed: Sep. 13, 2022

(65) Prior Publication Data

US 2023/0084743 A1 Mar. 16, 2023

(30) Foreign Application Priority Data

Sep. 13, 2021 (DE) ......................... 102021123635.5

(51) Int. Cl.

*H01R 13/621* (2006.01)
*H01R 13/52* (2006.01)
*H01R 13/6581* (2011.01)
*H01R 13/6592* (2011.01)
*H01R 24/66* (2011.01)

(Continued)

(52) U.S. Cl.

CPC ..... *H01R 13/6215* (2013.01); *H01R 13/5202* (2013.01); *H01R 13/6581* (2013.01); *H01R 13/6592* (2013.01); *H01R 24/20* (2013.01); *H01R 24/66* (2013.01); *H01R 2101/00* (2013.01)

(58) Field of Classification Search

None

See application file for complete search history.

(56) References Cited

U.S. PATENT DOCUMENTS 5,165,834 A * 11/1992 Takenouchi .......... F16B 43/001 411/533
7,306,475 B2 12/2007 Tsuruta
9,680,236 B2 6/2017 Eric et al.

(Continued)

FOREIGN PATENT DOCUMENTS

CN 201904508 U 7/2011
CN 106415940 A 2/2017

(Continued)

OTHER PUBLICATIONS

German's Office Action, Application No. 10 2021 123 635.5, Dated: May 17, 2022, 4 pages.

(Continued)

*Primary Examiner* — Oscar C Jimenez
(74) *Attorney, Agent, or Firm* — Barley Snyder

(57) ABSTRACT

A clamping screw device has a clamping screw extending in an axial direction and including a screw head that is rotatable, a screw body, and a screw foot. The clamping screw device has an electrical insulation on an outside of the screw head. The electrical insulation accommodates an electromagnetic shielding and/or a seal.

19 Claims, 3 Drawing Sheets

(51) Int. Cl.
*H01R 101/00* (2006.01)
*H01R 24/20* (2011.01)

(56) References Cited

U.S. PATENT DOCUMENTS

| | | | | |
|---|---|---|---|---|
| 9,871,305 | B2 | 1/2018 | Eisert | |
| 11,962,109 | B2 * | 4/2024 | Wolf | H01R 13/5045 |
| 2007/0207652 | A1 | 9/2007 | Tsuruta | |
| 2012/0231676 | A1 | 9/2012 | Picaud et al. | |
| 2018/0294600 | A1 | 10/2018 | Loncar et al. | |
| 2021/0257777 | A1 * | 8/2021 | Eheim | H01R 4/302 |
| 2022/0085541 | A1 * | 3/2022 | Reichel | H01R 13/621 |
| 2022/0336974 | A1 * | 10/2022 | Veihl | H01R 13/03 |
| 2023/0028765 | A1 * | 1/2023 | Yang | H01R 4/305 |

FOREIGN PATENT DOCUMENTS

| | | | |
|---|---|---|---|
| CN | 206650178 | U | 11/2017 |
| CN | 212587683 | U | 2/2021 |
| DE | 102014102659 | A1 | 9/2015 |
| DE | 102014216281 | A1 | 2/2016 |
| DE | 102015216543 | A1 | 3/2017 |
| EP | 3145034 | A2 | 3/2017 |
| GB | 2588769 | A | 5/2021 |
| JP | 2012256573 | A | 12/2012 |
| WO | 2021089522 | A1 | 5/2021 |

OTHER PUBLICATIONS

Korean Office Action dated Mar. 28, 2024 with English translation, corresponding to Application No. 10-2022-0113602, 21 pages.

Extended European Search Report dated Aug. 26, 2024, corresponding to Application No. 24176110.5-1201 / 4395090, 27 pages.

Extended European Search Report from the European Patent Office dated Jan. 27, 2023, corresponding to Application No. 22195273.2-1201, 13 pages.

Examination Report dated Jun. 13, 2024, corresponding to Application No. 22 195 273.2-1201, 15 pages.

Examination Report dated Dec. 1, 2023, corresponding to Application No. 22 195 273.2-1201, 10 pages.

Japanese Office Action dated Oct. 3, 2023 with English translation, corresponding to Application No. 2022-142634, 11 pages.

European Patent Office Communication dated Dec. 18, 2024, corresponding to Application No. 22 195 273.2-1201, 14 pages.

Chinese Office Action dated Sep. 19, 2025, corresponding to Application No. 202211100188.8, 10 pages.

* cited by examiner

HIGH-CURRENT CONNECTION CLAMPING SCREW DEVICE AS WELL AS ELECTRICAL HIGH-CURRENT CONNECTOR AND HIGH-CURRENT LINE CONNECTOR

CROSS-REFERENCE TO RELATED APPLICATION

This application claims the benefit of the filing date under 35 U.S.C. § 119(a)-(d) of German Patent Application No. 102021123635.5, filed on Sep. 13, 2021.

FIELD OF THE INVENTION

The present invention relates to an electrical connector and, more particularly, to a mechanical high-current connection clamping screw device for an electrical high-current connector.

BACKGROUND

In the electrical sector (electrics, electrical engineering, electrical power engineering etc.) beyond ground-based electrical power engineering and its analogues, a large number of electrical line connectors are known which serve the purpose of transmitting electrical currents and voltages in the medium- or high-current or -voltage range. In this case, the line connectors, for example for a power supply and/or a distribution of electrical energy in warm, possibly hot, contaminated, humid and/or chemically aggressive environments, in the short term and/or permanently, ensure problem-free transmission of electrical energy. Owing to a wide range of applications, a large number of such line connectors are known in the non-automotive sector and in the automotive sector.

Such high-current line connectors can be installed, for example, on/in an electrical entity, such as, for example, a rechargeable battery or a rechargeable battery module, or a (traction) battery or a battery module; an inverter; a switchgear assembly etc. High fuel costs and efforts to reduce environmental impact make, for example in the automotive sector, hybrid or electric vehicles necessary. One aspect of these vehicles is handling of high electrical charging and operating currents and/or voltages, wherein the components in question of the hybrid or electric vehicles need to designed correspondingly. This relates, for example, to high-current/high-voltage lines (for example stranded line, conductor bar, busbar, etc. consisting of copper or aluminum) and contact devices (for example terminal fitting, flat contact, busbar etc. consisting of aluminum or copper) of the line connectors.

In order to make electrical contact between an electrical entity and a high-current line connector, power electromechanical screw contact connections can be used which also meet stringent requirements. A mechanical path can be functionally separated from an electrical path by such a high-current screw contact connection. The mechanical path serves to transmit the mechanical tensile stresses of a screw fitting, in particular a steel-steel screw fitting, and the electrical path is used as a low-resistance electrical contact connection, in particular a copper-copper connection, of the high-current screw contact connection.

As a result, a robust and, in the typical manufacturing environment, easily handleable electrical high-current screw contact connection is provided. In addition, such a high-current screw contact connection is easily separable (diagnosis, recycling) and at the same time shockproof. Such high-current screw contact connections can be used in a variety of ways and flexibly for making contact with battery modules and for other connection points in various termination panels of an electrical power architecture. Efforts are continually being made to improve electrical high-current line connectors, in particular to design them to be more effective and to in the process make them cost-effective. It is therefore an object of the invention to specify an improved high-current screw contact connection.

SUMMARY

A clamping screw device has a clamping screw extending in an axial direction and including a screw head that is rotatable, a screw body, and a screw foot. The clamping screw device has an electrical insulation on an outside of the screw head. The electrical insulation accommodates an electromagnetic shielding and/or a seal.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
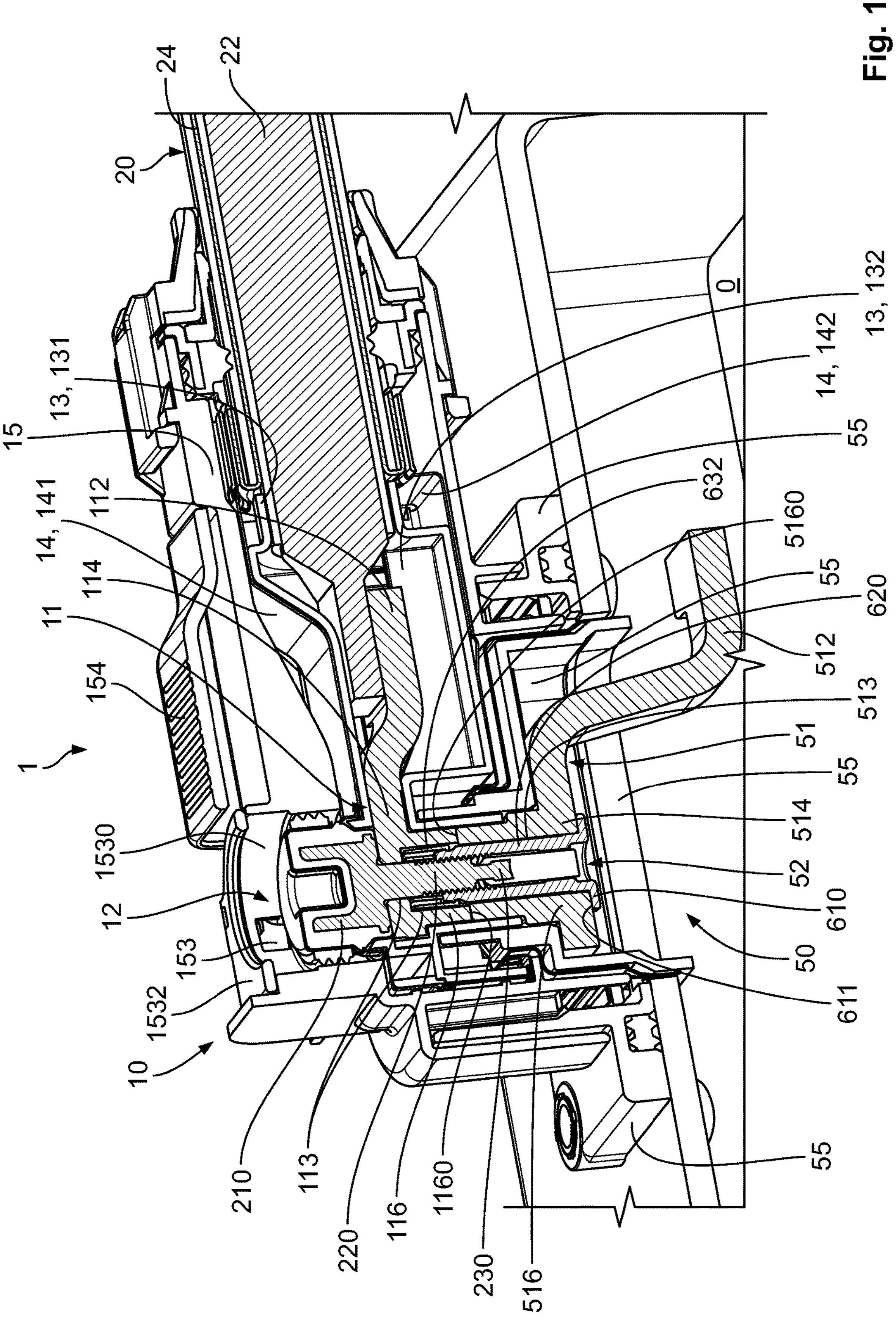
FIG. 1 is a sectional perspective view of an electrical high-current connector according to an embodiment of an electrical high-current line connection plugged together with an electrical high-current mating connector.

The invention is explained in greater detail below on the basis of exemplary embodiments with reference to the appended schematic drawings which are not to scale. Sections, elements, component parts, units, components and/or patterns which have an identical, unique or analogous configuration and/or function are identified by the same reference symbols. A possible alternative which is not explained, is not illustrated in the drawings, and/or is not definitive, a static and/or kinematic reversal, a combination etc. with respect to the exemplary embodiments of the invention or a component, a pattern, a unit, a component part, an element or a section thereof, can further be gleaned from the description of the figures.

In the case of the invention, a feature (section, element, component part, unit, component, function, variable etc.) can be of positive configuration, that is to say present, or of negative configuration, that is to say absent. In this specification, a negative feature is not explained explicitly as a feature if value is not placed on it being absent according to the invention. That is to say, the invention which is actually made and is not constructed by way of the prior art consists in omitting the said feature. A feature of this specification can be used not only in a specified manner and/or way, but rather also in another manner and/or way (isolation, combination, replacement, addition, on its own, omission, etc.).

The features of the description can also be interpreted as optional features; that is to say, each feature can be considered a non-mandatory feature. Therefore, a separation of a feature, possibly including its periphery, from an exemplary embodiment is possible, it then being possible for the said feature to be transferred to a generalized inventive concept. The absence of a feature (negative feature) in an exemplary embodiment shows that the feature is optional in relation to the invention. In addition, in the case of a type term for a feature, a generic term for the feature can also be implicitly understood (possibly further hierarchical breakdown into subgenus, etc.), as a result of which a generalization of the feature is possible, for example with consideration of equivalent effect and/or equivalence.

A (traction) battery is an indispensable part of an electrification of the drive trains of hybrid or electric vehicles. Such batteries consist of many individual cells which are each combined to form battery modules. All of the electrical energy during the operating modes of charging, travelling and recuperation must safely flow into the battery or be able to be removed from the battery via high-current line connections of these battery modules. Therefore, such line connections and their power electrics contact connections must be capable, under constricted conditions in terms of physical space, of conducting permanent currents of up to 600 A and in the future even above this for several minutes during a high-power charging cycle, while in dynamic drive modes they need to carry much higher currents for seconds (at least +175% to possibly over +500%). The same applies to the electrical voltages of these currents.

In addition, such a high-current contact connection of a battery module provides a physical layer for battery protection (overtemperature protection), battery management (states of charge), cell balancing (charge balancing between battery modules), mechanical protection, etc. For this purpose, a contact connection of each individual module of the battery which has good fatigue strength but is detachable is required. Such a contact connection not only needs to be configured as an integrated system for the life of the vehicle but also needs to be robust in such a way that vibrations and temperature influences do not influence the mechanical and electrical properties of the contact connection to an impermissible extent over the life. In addition, this contact connection need to be touch-safe in order that no risk is posed by high electrical currents and voltages in a high-voltage system such as the electrified vehicle.

Within the scope of the invention, the 'holes' unavoidably resulting in a screwable connection in layers of a construction of an electrical high-current connector of a high-current line connector have possibly proven to be a problem, depending on the application. In accordance with the invention, this is solved by a mechanical (high-current connection) clamping screw device according to the invention, i.e., apart from the resultant holes.

The invention will be explained in more detail below with reference to exemplary embodiments of two embodiments of a variant of a mechanical high-current connection clamping screw device 12 according to the invention, also referred to below and above simply as clamping screw device (12) (similarly also: high-current connection mating clamping screw device 52); a high-current connector 10 according to the invention; and a high-current line connector 1 according to the invention, also referred to below and above simply as line connector (1).

Although the invention is described and illustrated further in greater detail by way of exemplary embodiments, the invention is not restricted by the disclosed exemplary embodiments, but rather is of more fundamental nature. Other variations can be derived therefrom without departing from the scope of protection of the invention. The invention can be used in general in the electrical sector in the case of an entity (cf. above). One exception is formed here by ground-based electrical power engineering and analogues (very high to maximum electrical currents and voltages).

The drawings show only those physical sections of a subject matter of the invention which are necessary for understanding the invention. Designations such as connector and mating connector, contact device and mating contact device etc. are to be interpreted synonymously, that is to say they are possibly interchangeable in each case. The explanation of the invention with reference to the drawings relates below to an axial direction Ar (axial), a radial direction Rr (radial) and a circumferential direction Ur (tangential) of the clamping screw device 12 (cf. FIGS. 2 to 5) and its connection partner, a mating clamping screw device 52 (cf. FIG. 1).

FIG. 1 shows an entity 0 (electrical entity 0) which is electrically contactable by the line connector 1: 10, 20 according to the invention. The entity 0 comprises, for this purpose, a high-current mating connector 50, which in this case is set up as a socket 50 on the outside on entity 0. The high-current mating connector 50 comprises, in a housing 55, a solid high-current mating contact device 51 (simply mating contact device 51 below) having a mating contact section 516. The mating contact section 516 is in this case designed to be substantially hollow-cylindrical, wherein the free end side of this (as far as possible) thick (current-carrying capacity) hollow cylinder forms a mating contact-making area 5160. The mating contact device 51, in an embodiment, comprises copper or aluminum.

The entity 0 can be in the form of, for example, a power electrics unit, a power electrics device, a power electrics module, a power electrics apparatus, a power electrics installation, a power electrics system, a module of a rechargeable electric battery or of an electric battery, a rechargeable electric battery or an electric battery, a power electrics inverter (for front-wheel drive and/or rear-wheel drive), a power electrics switchgear assembly, etc. In this case, the line connector 1 can be arranged, for example, between two such entities 0.

The mating contact section 516 protrudes in particular substantially perpendicularly away from a mechanical mating clamping section 514 of the mating contact device 51, which mating clamping section 514 merges integrally with a mating contact section 512 of the mating contact device 51 for a high-current line. The mating clamping section 514 and the mating contact section 516 with the mating contact-making area 5160 comprise a (coaxial) through recess 513 (in an embodiment with a constant diameter) in the mating contact device 51, in which a mechanical mating clamping screw device 52 can be accommodated. Other configurations of the mating contact device 51 can naturally be used.

The mating clamping screw device 52 is in this case in the form of a threaded sleeve having a mating screw head 610 and a mating screw body 620 which axially Ar adjoins the said mating screw head 610 and has an internal thread, as shown in FIG. 1. An external thread can naturally also be used in another embodiment. In an embodiment, a ring-shaped touch guard 632 is arranged on a free end of the mating screw body 620. The mating screw head 610 rests with a flange 611 opposite the mating contact section 516 on the mating clamping section 514 of the mating contact device 51 and prevents the mating clamping screw device 52 from being able to be plugged through the through recess 513 in the mating contact device 51.

Electrical contact can be made with the electrical mating contact-making area 5160 by a contacting surface 1160 of a contact section 116 of a, in an embodiment, solid high-current contact device 11 (simply contact device 11 below) of the high-current connector 10, shown in FIG. 1. The contact section 116 protrudes in particular substantially perpendicularly away from a mechanical clamping section 114 of the contact device 11, which clamping section 114 may merge integrally with a contact section 112 of the contact device 11 for a high-current line 22. The contact device 11, in an embodiment, comprises copper or aluminum. The high-current line 22 can for all embodiments be in the form of, for example, a (rigid) conductor bar, a busbar, a (limitedly flexible) stranded conductor line etc. and may comprise aluminum or copper.

The contact section 116 is in this case, similarly to the mating contact section 516, designed to be substantially hollow-cylindrical, wherein the free end side of this (as far as possible) thick (current-carrying capacity) hollow cylinder forms the contacting surface 1160. The contact device 51 can be designed to be angled, wherein the contact section 116 for the high-current line and the clamping section 114 adjoin one another integrally primarily or substantially in one direction (possibly including a step), wherein the contact section 116 protrudes substantially perpendicularly with the contacting surface away from the clamping section 114.

The clamping section 514 and the contact section 516 with the contacting surface 1160 comprise a (coaxial) through recess 113 in the contact device 11, in which the mechanical clamping screw device 12 can be accommodated. In this case, the through recess 113 can be designed to be stepped, as shown in FIG. 1, wherein the through recess 113 has a smaller radius in the clamping section 114, for centering reasons (screw body 220, cf. below) for the clamping screw device 12 than the through recess 113 has in the contact section 116. Other configurations of the contact device 11 can naturally be used.

Embodiments according to the invention of the clamping screw device 12 are explained in more detail further below with reference to FIGS. 2 to 5.

In the case of a line connector 1 which is ready for use, a high-current line 22 of a high-current line connection 20 is electrically connected to the contact section 112 of the contact device 11 of the high-current connector 10, wherein the high-current line connection 20 may comprise an electromagnetic shielding 24, which is arranged between two layers of electrical insulation of the high-current line connection 20 (cf. FIG. 1).

The high-current line 22 can be embedded in an electromagnetically shielded high-current line connection 20. In addition, an electromagnetic shielding 214 of the high-current connector can be in electrically conductive contact with an electromagnetic shielding 24 of the high-current line. Furthermore, an electrical outer insulation of the high-current line 22 can be sealed with respect to the housing 15 and fixed by latching devices.

The line connector 1 according to the invention comprises at least one high-current connector 10 according to the invention having an embodiment according to the invention of the clamping screw device 12. In addition, the line connector 1 can comprise, in addition to the one high-current connector 10 according to the invention, a second high-current connector (10), which is designed in accordance with the invention or not in accordance with the invention. In this case, it is naturally also possible for a high-current line connection 20 to be used which is different from the one illustrated.

The contact device 11 is accommodated with the high-current line 22, which is materially integrally fixed thereto, in an electrically insulating cladding 13. In this case, in addition the transition region to the high-current line 22 and therefore a longitudinal end section of the high-current line 22 is also accommodated in the insulating cladding 13. The insulating cladding 13 can comprise two cladding parts 131, 132, in particular an upper cladding part 131 and a lower cladding part 132.

In an embodiment, an electromagnetic shielding 14 of the high-current connector 10 is arranged on the outside on the electrically insulating cladding 13, wherein this electromagnetic shielding 14 makes electrical contact with the electromagnetic shielding 24 of the high-current line 22. In addition, electrical contact is made with the electromagnetic shielding 14 of the high-current connector 10 by an electromagnetic shielding of the high-current mating connector 50 in a plugged-together state of the high-current connector 10 and the high-current mating connector 50. The electromagnetic shielding 14 can comprise two shield parts 141, 142, in particular an upper shield part 141 and a lower shield part 142.

This stack comprising contact device 11, including longitudinal end section of the high-current line 22, its electrically insulating cladding 13 and its electromagnetic shielding 14 is accommodated in a housing 15, as shown in FIG. 1. In one region of the clamping section 114 of the contact device 11, the housing 15 comprises a through recess 153, in which the clamping screw device 12 is accommodated, in an embodiment in anti-loss fashion (anti-loss device 1532, for example in the form of a cap with an access opening for a tool).

Figure 2:
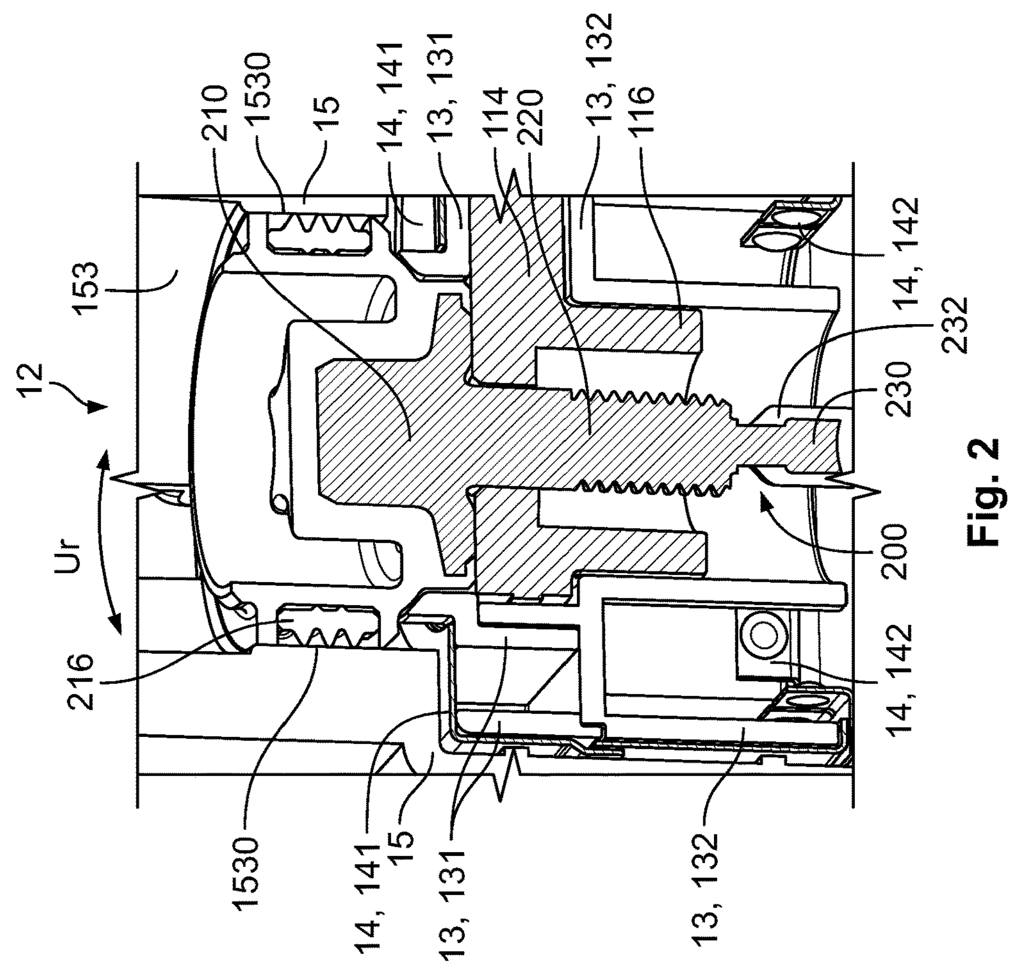
FIG. 2 is a detail sectional perspective view of an electrical clamping screw device in an electrical high-current connector according to an embodiment.

As shown in FIG. 2, an inner side 1530 of the through recess 153 can be in the form of a sealing face 1530 for a seal 216 of the clamping screw device 12. As an alternative or in addition, this can be designed conversely, i.e., the through recess 153 comprises a seal on the inside for the clamping screw device 12. The through recess 153 can be coverable by a protective cap 154, shown in FIG. 1. In this case, the protective cap 154 can be in the form of a protective cap slider 154. Another protective cap 154, for example a foldable protective cap, a separate protective cap etc., can naturally be used.

Figure 3:
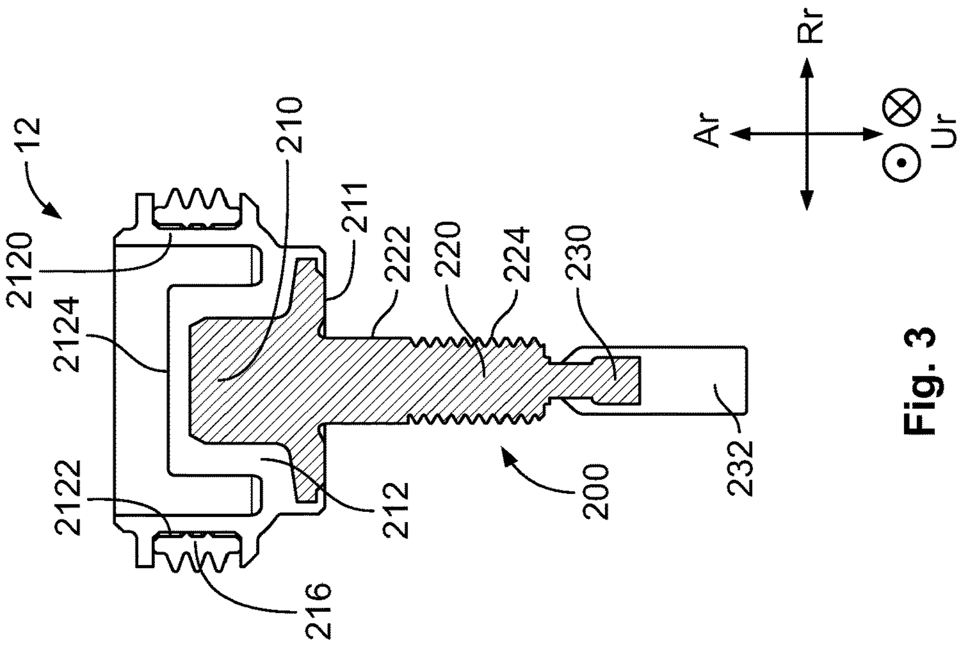
FIG. 3 is a sectional side view of the electrical clamping screw device of FIG. 2.
Figure 5:
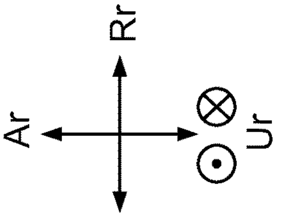
FIG. 5 is a sectional side view of the electrical clamping screw device of FIG. 4.
Figure 5:
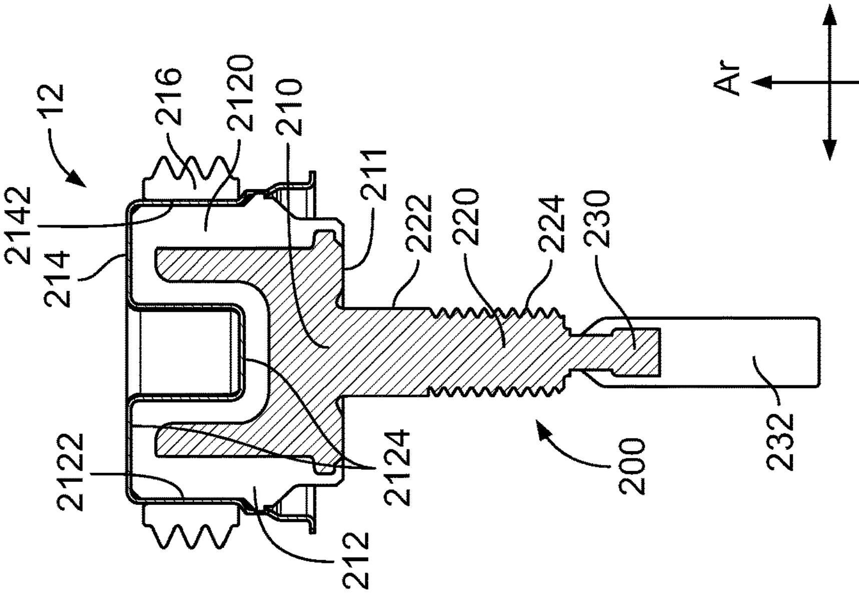
Figure 4:
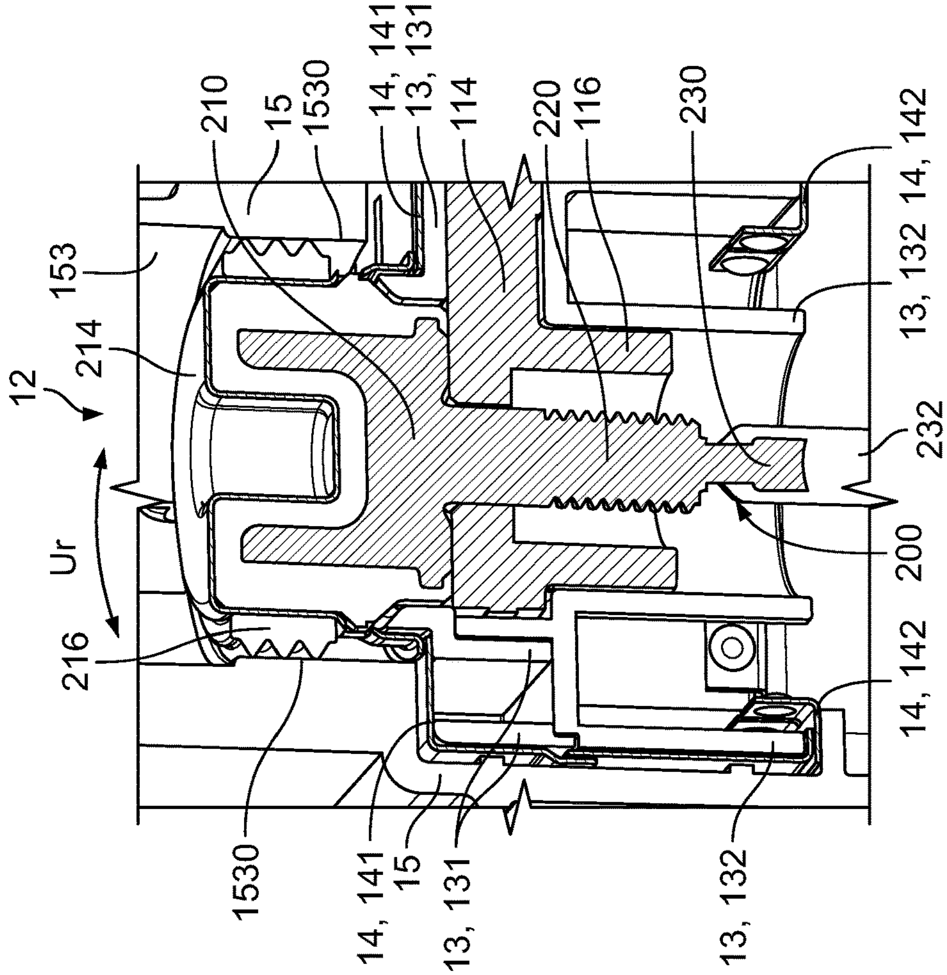
FIG. 4 is a detail sectional perspective view of an electrical clamping screw device according to another embodiment in an electrical high-current connector.

The clamping screw device 12, cf. FIGS. 2 to 5 and in particular FIGS. 3 and 5, in screwed-together interaction with the mating clamping screw device 52, serves the purpose of mechanically, permanently and fixedly clamping the contacting surface 1160 of the contact section 116 of the contact device 11 against the mating contact-making area 5160 of the mating contact section 516 of the mating contact device 51 for transmitting high electrical currents and voltages. For this purpose, the clamping screw device 12 and the mating clamping screw device 52 are screwed to one another, wherein the clamping screw device 12 (external thread) is screwed into the mating clamping screw device 52 (internal thread) in an embodiment. This can naturally be designed kinematically in reverse fashion.

In this case, starting from the clamping screw device 12 (flange 211, cf. below) which rests fixedly on the outside on the clamping section 114 of the contact device 11, and starting from the mating clamping screw device 52 which rests fixedly on the outside on the mating clamping section 514 of the mating contact device 51 (flange 611), the contact section 116 and the mating contact section 516 are pressed one on top of the other and held fixedly against one another. In this case, the screw composite consisting of the clamping screw device 12 and the mating clamping screw device 52 extends through the through recesses 113, 513 in the contact section 116 and the mating contact section 516.

The respective embodiment, shown in FIG. 3 and FIG. 5, of the clamping screw device 12 comprises a clamping screw 200 in the form of a partially threaded screw 200 (bolt 200), which integrally comprises, one behind the other in the axial direction Ar, a screw head 210, a screw body 220 and also an in particular pronounced screw foot 230. In this case, the screw foot 230 is in the form of a protrusion of the screw body 220 on which a touch guard 232 is provided. It is also possible to integrate the screw foot 230, for example in the form of a recess, in the screw body 220 and then to fit the touch guard 232 therein, which touch guard 232 then sits in the screw foot 230 and protrudes away from the screw body 220. In an embodiment, the touch guard 232 can be injection-molded onto the threaded shank and/or onto the screw foot 230 or injection-molded around the screw foot 230. The touch guard 232 may be formed from plastic.

The screw body 220 in this case comprises a substantially smooth screw shank 222 for centering the clamping screw device 12 in the clamping section 114 of the contact device 11. The screw shank 222 merges with a threaded shank 224 having an external thread (possibly also internal thread), by which the clamping screw device 12 can be screwed into the mating clamping screw device 52. In this case, the screw head 210 rests with a flange 211 opposite the contact section 116 on the clamping section 114 and prevents the clamping screw device 12 from being able to be plugged through the through recess 113 in the contact device 11.

The screw head 210 is at least partially, and in an embodiment up to the flange 211, embedded in an electrical insulation 212, wherein the screw head 210 and the electrical insulation 212 form a fixed composite. The screw head 210 can in this case comprise an exclusively positive form (present material of the screw head 210, for example an outer n-sided profile or an analogue thereof, FIG. 3) or an additionally negative form (absent material of the screw head 210, for example an inner n-sided profile or an analogue thereof, FIG. 5).

The screw head 210 can comprise, independently of its form, an electromagnetic shielding 214 and/or a seal 216. The electromagnetic shielding 214 can be embedded in the electrical insulation 212 or provided on the outside on the electrical insulation 212, as shown in FIG. 5. In this case, the electromagnetic shielding 214 extends far in the axial direction Ar in the direction of the screw body 220 such that electrical contact can be made with the electromagnetic shielding 14 of the high-current connector 10. In this case, the shielding 214 can make direct electrical contact with the shielding 14 and/or an electrical contact can be produced with the aid of an additional component part therebetween, such as, for example, an EMC seal. In addition, the electromagnetic shielding 214 surrounds the electrical insulation 212 and/or the screw head 210, in an embodiment completely in the circumferential direction Ur. The electromagnetic shielding 214 has a circumferential surface 2142, possibly for seal 216.

In this case, the circumferential surface of the electrical insulation 212, which further extends in the axial direction, can be designed to be oval, elliptical or circular on the electrical insulation 212. The electrical insulation 212 can be injection-molded on the outside onto the screw head 210, on the inside into the electromagnetic shielding 214, or between the screw head 210 and the electromagnetic shielding 214.

The seal 216 is provided over the full circumference in the circumferential direction Ur radially outwards on the screw head 210, wherein the seal 216 sits either on the electrical insulation 212 (FIG. 3) or on the electromagnetic shielding 214 (FIG. 5). In this case, the seal 216 can be a separate component part or can be connected in materially fixed fashion, in particular by an injection-molding process, to the screw head 210 or to the electrical shielding 214.

The screw head 210 of the clamping screw 200 of the first embodiment (FIG. 3) comprises an outer profile which merges with a collar radially Rr outwards on the screw shank 222 and whose lower rim forms the flange 211. The electrical insulation 212 is provided on the outside on this outer profile, wherein a circumferential wall 2120 of the electrical insulation 212 surrounds the electrically insulated screw head 210, in an embodiment completely in the circumferential direction Ur with a radial Rr spacing. The circumferential wall 2120 can be spaced apart with respect to the outer profile and possibly with respect to the electromagnetic shielding 214 of the outer profile, possibly the electromagnetic shielding 214 can cover the circumferential wall 2120 at least on one side or on both sides (relatively large areas), and/or possibly the seal 216 can be arranged radially outwards on the circumferential wall 2120 or radially outwards on the electromagnetic shielding 214.

The screw head 210 and/or the electromagnetic shielding 214 can comprise an outer profile or an inner profile for a screwdriving tool. The screw head 210 can sit fixedly in the electrical insulation 212. In addition, the electrical insulation 212 can sit fixedly in the electromagnetic shielding 214. Furthermore, the seal 216 can sit fixedly on the electrical insulation 212 or fixedly on the electromagnetic shielding 214.

The circumferential wall 2120 imparts a pot shape to the electrical insulation 212. The electromagnetic shielding 214 can be in the form of a pot which completely covers the screw head 210. In an embodiment, the electromagnetic shielding 214 is in the form of a shroud. The electromagnetic shielding 214 can be in the form of a deep-drawn electromagnetic shielding. The seal 216 can be in the form of a ring seal or sleeve seal having at least one sealing lip. In an embodiment, the seal 216 is in the form of an elastomer seal. The seal 216 can be injection-molded onto the electrical insulation 212 or the electromagnetic shielding 214. In an embodiment, the clamping screw 52 is produced from a metal or a metal alloy and in particular from a steel. In addition, the electrical insulation 212 is produced from a plastic.

A seal 216 is arranged on a radial Rr circumferential surface 2122 of the circumferential wall 2120, wherein at least one sealing lip of the seal 216 protrudes radially Rr outwards. The clamping screw device 12 can be sealed against the sealing surface 1530 of the through recess 153 in the housing 15 by the seal 216 and the electrical insulation 212. In addition, in this embodiment of the clamping screw 200, an electromagnetic shielding 214 can be used.

The screw head 210 of the clamping screw 200 of the second embodiment (FIG. 5) comprises a pot-shaped inner profile which merges with a collar radially Rr outwards on the screw shank 222 and whose lower rim forms the flange 211. The electrical insulation 212 is arranged on the inside, on the end side and on the outside on this inner profile, wherein an outer circumferential wall 2120 of the electrical insulation 212 rests directly on an outside of the pot-shaped inner profile.

The electromagnetic shielding 214 is arranged on a radial Rr circumferential surface 2122 of the circumferential wall 2120, an axial Ar end side of the electrical insulation 212 and an inner wall of the electrical insulation 212 in the inner profile, as shown in FIG. 5. A seal 216 is arranged on a radial Rr circumferential surface 2142 of the electromagnetic shielding 214, wherein at least one sealing lip of the seal 216 protrudes radially Rr outwards. The clamping screw device 12 can be sealed against the sealing surface 1530 of the through recess 153 in the housing 15 by the seal 216 and the electrical insulation 212. In addition, in this embodiment of the clamping screw 200, the electromagnetic shielding 214 can be omitted.

In accordance with the invention, the 'holes', which were responsible in particular for an undesired transfer of material and/or an interruption to the shield, are 'plugged'. This is achieved in accordance with the invention in particular without an additional production step or an additional separate component part, i.e. without an additional assembly step or no additional element needs to be assembled. In accordance with the invention, it is sufficient to design an already existing clamping screw device in accordance with the invention. The clamping screw device can in this case be manufactured in a single, automatable production step, for example in an injection-molding machine (for this purpose possibly only the electromagnetic shielding is required as an additional insert part). In this case, possibly a housing of the high-current connector needs to be adapted, but this is likewise managed without an additional production step and an additional component part.

In particular, the high-current (plug-type) connector 1 can be used in a hybrid or electric vehicle, i.e., a motor vehicle having an electric traction engine, for transport of electrical energy. In this case, the high-current connector 1 can be used in particular for the transport of energy to the (traction) battery of the vehicle (charging, charging operating mode, recuperation operating mode) and/or from the battery ((electric) travelling operating mode, recuperation operating mode). The contact device can be in the form of a busbar.

The high-current connector 1 can be designed for permanent electrical currents of at least approximately: 100 A, 200 A, 300 A, 400 A, 500 A, 750 A, 1 kA or 1.25 kA. In this case, the high-current connector 1 can further be configured in such a way that it can withstand in each case markedly higher, short-term, electrical currents (for example dynamic drive mode, approximately: +175%, +200%, +250%, +300%, +350%, +400%, +500%). The high-current connector 1 can be designed for electrical voltages of at least approximately: 200V, 300V, 400V, 500V, 600V, 750V, 1 kV, 1.25 kV, 1.5 kV, 1.75 kV or 2 kV. In this case, the high-current connector 1 can further be configured in such a way that it can withstand in each case markedly higher, short-term, electrical voltages (for example dynamic drive mode, approximately: +175%, +200%, +250%, +300%, +350%, +400%, +500%).

The high-current connector 1 can meet, for example in accordance with LV 214 or an analogue, the vibration requirements of the class or in accordance with the degree of severity: 2, 3 and/or 4. In particular, the vibration requirement of the class or in accordance with degree of severity 3 is met by the high-current connector 1. In addition, it may be possible for the high-current connector 1, for example in accordance with LV 214 or an analogue, to not meet the vibration requirements of the class or in accordance with degree of severity: 4 and/or higher.—The high-current connector 1 may be designed for a use temperature of approximately −40° C. to approximately: 80° C., 100° C., 120° C., 140° C., 150° C., 160° C., 170° C. or 180° C.

What is claimed is:

1. A clamping screw device, comprising:

a clamping screw extending in an axial direction and including a screw head that is rotatable, a screw body, and a screw foot; and an electrical insulation on an outside of the screw head, the electrical insulation accommodates an electromagnetic shielding and a seal.

2. The clamping screw device of claim 1, wherein the screw head is embedded in the electrical insulation and the electrical insulation has a circumferential surface on which the electromagnetic shielding and/or the seal are arranged radially outward.

3. The clamping screw device of claim 2, wherein the electrical insulation is injection-molded on the outside of the screw head, on an inside of the screw head, or between the screw head and the electromagnetic shielding.

4. The clamping screw device of claim 1, wherein:

the electrical insulation has an end face on which the electromagnetic shielding is arranged, the seal is arranged in a circumferential direction radially outwards on a circumferential surface of the electromagnetic shielding, and/or the screw head and/or the electromagnetic shielding has an outer profile or an inner profile for a screwdriving tool.

5. The clamping screw device of claim 1, wherein the electromagnetic shielding is a pot that completely covers the screw head.

6. The clamping screw device of claim 1, wherein the seal is a ring seal or a sleeve seal having a sealing lip.

7. The clamping screw device of claim 1, wherein:

the screw head has a flange for mechanically clamping an electrical high-current contact device, the screw body has a smooth screw shank and a threaded shank axially adjoining the smooth screw shank, and/or the threaded shank or the screw foot has a touch guard protruding away from the threaded shank.

8. An electrical high-current connector, comprising:

a clamping screw device including a clamping screw extending in an axial direction and having a screw head that is rotatable, a screw body, and a screw foot, and an electrical insulation on an outside of the screw head, the electrical insulation accommodates an electromagnetic shielding and a seal; and a contact device mechanically clamped against a mating contact device by the clamping screw device, the clamping screw device and the contact device electrically connect with the mating contact device.

9. The electrical high-current connector of claim 8, wherein the contact device has a first contact section for a high-current line, a mechanical clamping section, and a second contact section with a contacting surface.

10. The electrical high-current connector of claim 8, wherein an electromagnetic shielding of the electrical high-current connector is electrically contactable by the electromagnetic shielding of the clamping screw device.

11. The electrical high-current connector of claim 8, further comprising a housing with a through recess receiving the clamping screw device.

12. The electrical high-current connector of claim 11, wherein:

the seal of the clamping screw device can seal with an inner side of the through recess and/or an outside of the clamping screw device, the housing has a pair of housing parts between which the contact device and an electromagnetic shielding of the electrical high-current connector are accommodated, and/or the through recess of the housing is covered by a protective cap formed as a protective cap slider mounted on the housing.

13. The electrical high-current connector of claim 8, wherein an electromagnetic shielding of the electrical high-current connector is on an electrically insulating cladding of the contact device.

14. The electrical high-current connector of claim 13, wherein the electrically insulating cladding has a pair of cladding parts that each include a shield part of the electromagnetic shielding of the electrical high-current connector, the shield parts are latched to one another and in electrically conductive contact with one another.

15. The electrical high-current connector of claim 8, wherein the electrical high current connector:

is designed for permanent electrical currents of at least approximately 100 A, is designed for electrical voltages of at least approximately 200V, and/or meets a vibration requirement of class LV 214.

16. An electrical high-current line connector, comprising:

an electrical high-current connector, including:

a clamping screw device including a clamping screw extending in an axial direction and having a screw head that is rotatable, a screw body, and a screw foot, and an electrical insulation on an outside of the screw head, the electrical insulation accommodates an electromagnetic shielding and a seal; and a contact device mechanically clamped against a mating contact device by the clamping screw device, the clamping screw device and the contact device electrically connect with the mating contact device.

17. The electrical high-current line connector of claim 16, wherein:

the contact device forms an electrical high-current line connection, an electromagnetic shielding of the electrical high-current connector shields a connecting region of a contact section of the contact device, and/or the electrical high-current connector is one of a pair of electrical high-current connectors of the electrical high-current line connector.

18. The electrical high-current line connector of claim 16, wherein the contact device is connected to an electrical high-current line embedded in an electromagnetically shielded high-current line connection, an electromagnetic shielding of the electrical high-current connector is electrically connected with an electromagnetic shielding of the electrical high-current line, and/or an electrical outer insulation of the electrical high-current line is sealed with respect to a housing of the electrical high-current connector and fixed.

19. An electrical entity, comprising:

a clamping screw device including a clamping screw extending in an axial direction and having a screw head that is rotatable, a screw body, and a screw foot, and an electrical insulation on an outside of the screw head, the electrical insulation accommodates an electromagnetic shielding and a seal.

* * * * *